UNITED STATES PATENT OFFICE.

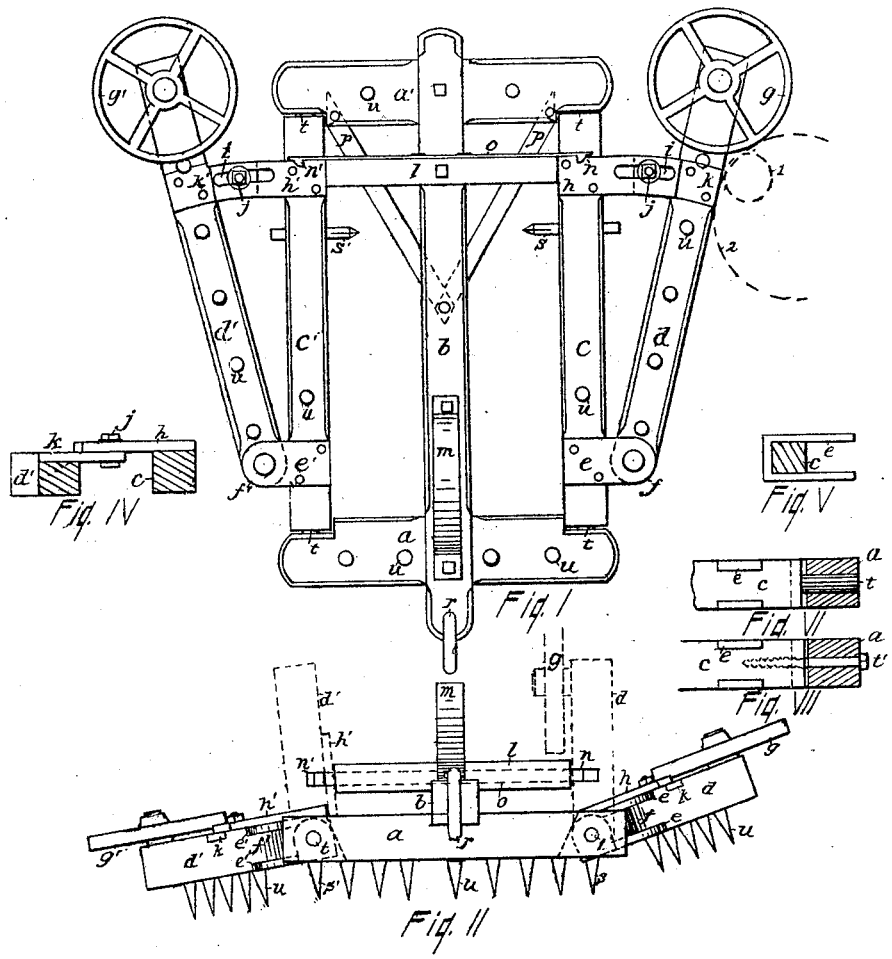
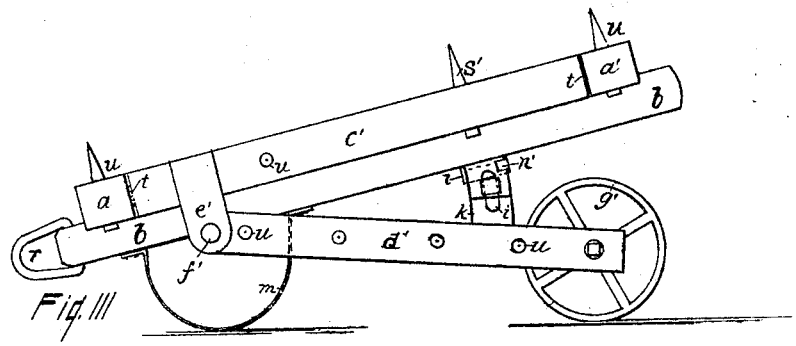

ORLANDO D. LENT, OF PEEKSKILL, NEW YORK.

HARROW.

No. 799,604. Specification of Letters Patent. Patented Sept. 12, 1905.

Application filed September 22, 1903. Renewed June 6, 1905. Serial No. 263,931.

*To all whom it may concern:*

Be it known that I, ORLANDO D. LENT, a citizen of the United States, and a resident of Peekskill, in the county of Westchester and State of New York, have invented certain new and useful Improvements in Harrows, of which the following is a specification.

This invention relates to harrows, and has for its objects, in a harrow, flexibility, adjustability as to its width, capability of being folded, and adaptability for transportation. These objects are attained by the means set forth in this specification and the accompanying drawings.

In the drawings like characters refer to similar parts throughout the several views.

Figure I is a plan of the harrow. Fig. II is an end view of the harrow. Fig. III is a side view of the harrow in form for transportation. Figs. IV, V, VI, VII are details relating to parts of the harrow to be described.

The main frame of the harrow consists of the central bar $b$, with the front cross-bar $a$ and rear cross-bar $a'$ mortised and securely bolted together and braced as needful, as at $p\,p$. The outer ends of the bars $a\,a'$ are adapted to receive tenoned ends $t$ of the side bars $c\,c'$ in such a manner as to enable them to turn on the tenons, which are rounded, as in Fig. VI, and also shown in end views in Fig. II. Yokes $e\,e'$ (shown in all the figures except Fig. IV) are secured to the forward ends of the side bars $c\,c'$, and the side swinging bars $d\,d'$ are pivoted in these yokes, as at $f\,f'$. These bars are held in the same horizontal plane with the bars $c\,c'$, but the rear ends are adapted to be swung away from or close to them and are held in any desired position by the overlapping and slotted sectors $h\,k\,h'\,k'$, which are slotted and bound together by bolts $j$. By means of these bars and adjustments the width of the harrow may be regulated. The width of the harrow may be still further regulated by reason of the side-bar combinations $c\,d$ and $c'\,d'$ being rotatable on the pivots $t$. These bars may be swung so that the bars $d\,d'$ will be above the bars $c\,c'$, as shown by broken lines in Fig. II. In order to hold the sides in these vertical positions, a cross-bar $l$, Figs. I, II, III, is secured to the frame and supports a spring $o$, on the ends of which are hooks $n'$ $n$. The hooks catch upon the sectors and retain the sides in position. The slots $i$ in the sectors admit of a considerable widening of the harrow, while the folding of the sides, as in Fig. II, reduces the harrow to a narrow one.

The pivoted sides also give flexibility to the harrow, as shown in Fig. II.

In Fig. IV the method of applying the sectors to the side bars is shown, one being placed on top of one bar, the other being set in the bar.

Fig. V illustrates the preferable method of applying the yokes $e\,e'$ to the bars $c\,c'$.

Fig. VII shows how simple lag-bolts may be used to form the pivots for the bars $c\,c'$ instead of the tenons shown in Fig. VI.

Wheels $g\,g'$ are placed on the rear ends of the bars $d\,d'$ for two purposes. When a harrow is used in an orchard or among trees, the trees are liable to injury from the ends of the harrow dragging against them. The rubbing of the side of the harrow is not so liable to do harm as the scraping of the end of the harrow. In Fig. I the broken circles 1 2 represent trees and illustrate how when this harrow comes in contact with a tree the wheel will roll across its bark and leave it uninjured. Another object of the wheels is this, a curved strap $m$, Figs. I, II, III, is secured to the bar $b$. When the sides of the harrow are folded, as shown by broken lines in Fig. II, it may be turned upside down, as in Fig. III. It is thus in shape for transportation. A horse may be hitched to it and the harrow be drawn even across a lawn harmlessly, the harrow resting on its loop and the wheels, or the clevis $r$ may be hooked to the rear of a wagon, when the harrow will ride upon its two wheels.

In Fig. II one side of the harrow is shown in broken lines to be standing straight up, while the other inclines a little outwardly. The outward inclination may be adapted to give a wider spread to the wheels when the harrow is folded.

All the bars described except the top one, $l$, are supplied with teeth $u$, and the bars $c\,c'$ have teeth in their sides, as at $s\,s'$, which are thrown into position for use when the harrow is made to assume its narrowest form.

Having described my invention, what I claim, and desire to secure by Letters Patent, is—

1. The combination in a harrow of a main frame comprising a central bar with cross-bars at each end, side bars pivoted between the ends of the said cross-bars, swinging bars hinged to the forward part of the pivoted bars, and having their rear ends adjustable with reference to the pivoted bars by means of sectors and a clamping-bolt, a top cross-bar supporting spring-catches, said spring-catches adapted to hold the movable sides, teeth in the several bars and teeth in the pivoted bars normally at right angles to the teeth in the middle section, a loop on the forward part of the central bar, and wheels on the rear ends of the adjustable bars, substantially as set forth.

2. The combination in a harrow of a main frame comprising a central bar with cross-bars at each end, side bars pivoted between the ends of the cross-bars, swinging bars hinged to the forward part of the pivoted bars and having their rear ends adjustable with reference to the pivoted bars, adjustable sectors with clamping-bolt uniting the pivoted and swinging bars, and teeth in all the bars.

3. The combination in a harrow of a main frame comprising a central bar with cross-bars at each end, side bars pivoted between the said cross-bars, swinging bars hinged to the side bars with one end adjustably connected with the side bars, harrow-teeth in all of the said bars, spring-hooks secured to the central bar to hold the pivoted bars when raised, wheels on the rear ends of the swinging bars, a loop on the forward end of the central bar, the whole adapted to be folded, and drawn on the said loop and wheels, substantially as set forth.

Signed at Peekskill, in the county of Westchester and State of New York, this 3d day of August, A. D. 1903.

ORLANDO D. LENT.

Witnesses:
 OSCAR CLARK,
 FLOYD F. POWELL.